No. 866,328. PATENTED SEPT. 17, 1907.
A. P. BRUSH.
BRAKE MECHANISM.
APPLICATION FILED AUG. 31, 1906.
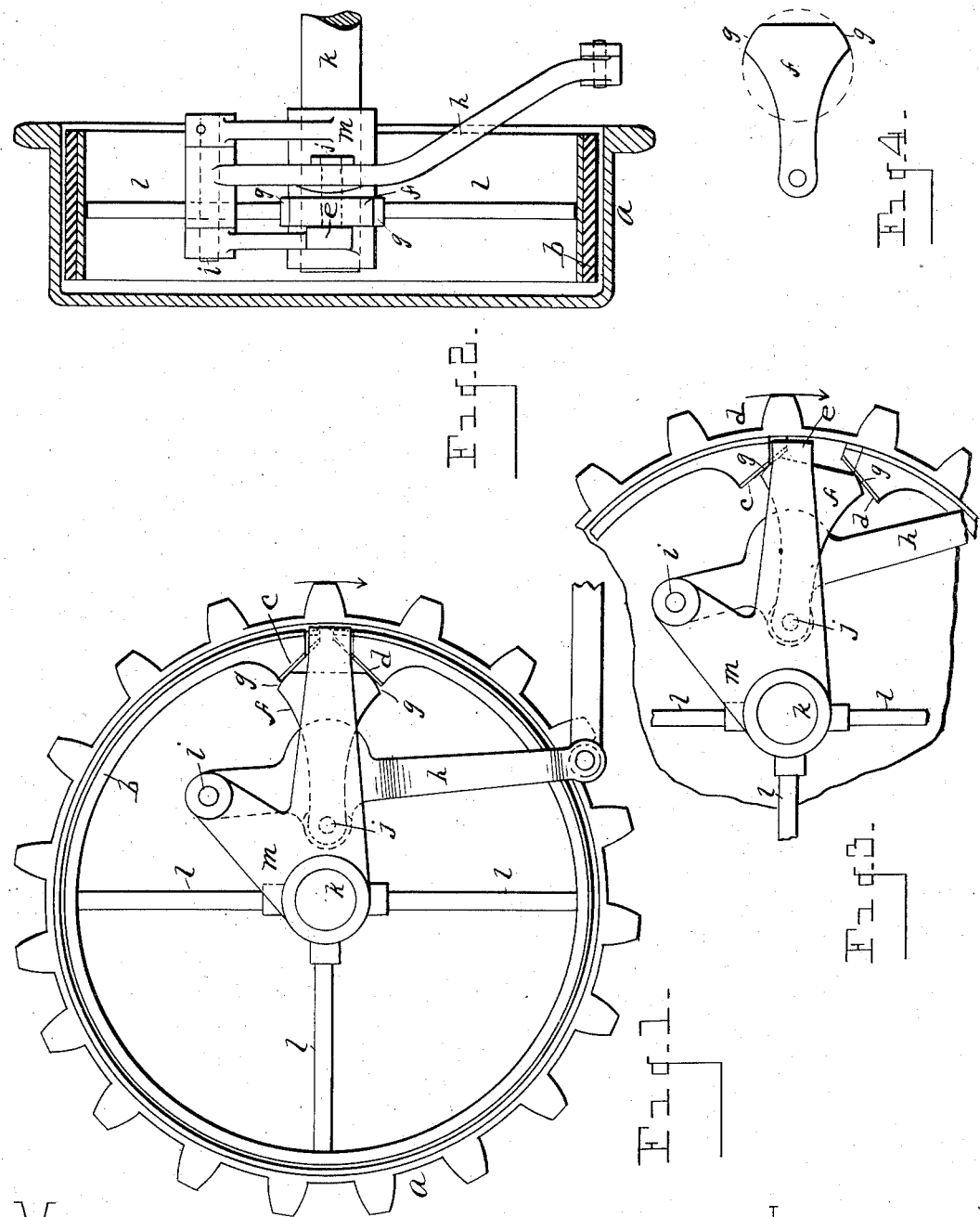

UNITED STATES PATENT OFFICE.

ALANSON P. BRUSH, OF DETROIT, MICHIGAN.

BRAKE MECHANISM.

No. 866,328.        Specification of Letters Patent.        Patented Sept. 17, 1907.

Application filed August 31, 1906. Serial No. 332,781.

*To all whom it may concern:*

Be it known that I, ALANSON P. BRUSH, a citizen of the United States, residing at Detroit, county of Wayne, State of Michigan, have invented a certain new and useful Improvement in Brake Mechanisms, of which the following is a specification, reference being had to the accompanying drawings, which form a part of this specification.

My invention is designed to provide an improved brake mechanism, the same being more particularly designed for use in automobiles and like structures, but I do not limit myself thereto, as my invention contemplates as coming within its scope, any use to which it may be applied.

My invention consists of the structure hereinafter described and claimed, and illustrated in the accompanying drawings, in which, Figure 1 is a view in elevation illustrating features of my invention showing the mechanism in released position. Fig. 2 is a view in transverse section. Fig. 3 is a similar view to Fig. 1, but showing the mechanism set with the rotation of the drum in the direction indicated by the arrow. Fig. 4 is a detail view illustrating the construction of the wedge.

My improved brake mechanism applies to that class of brakes wherein an internal friction drum is provided with an internal friction band. Accordingly $a$ represents the drum, which may be as shown herewith, a combined brake drum and sprocket wheel, and $b$ is the internal friction band. The extremities of the band are preferably provided with angularly and diverging wedge shaped surfaces indicated at $c$ and $d$. Between the extremities of the friction band is located a fixed stop indicated at $e$. Means are also provided to force the extremities of the band apart, and against the drum. The means shown herewith consists essentially of a wedge $f$ provided with arc shaped faces indicated at $g$, $g$ to contact with the wedge shaped faces $c$, $d$ of the band, said wedge being pivoted upon and actuated by a lever $h$ fulcrumed as at $i$ upon a stationary part of the axle, the wedge being preferably pivoted on a pin indicated at $j$ rigidly engaged with the lever and upon which the wedge is sleeved. The fixed stop is also shown projecting from a fixed part of the axle. The shaft or spindle upon which the drum is mounted is indicated at $k$. When the brake is set by the movement of the lever $h$ and with it the wedge $f$ the action is obviously as follows: The pressure of the wedge upon the angular faced ends of the band expands the band by forcing the ends apart and also forces the ends of the band against the drum, leaving the band, however, free to rotate with the drum so far as the wedge $f$ is concerned, by reason of its being pivoted at the point $j$. The band thus expanded within the drum will rotate with the drum until one end thereof, as shown in Fig. 3, contacts with the fixed stop $e$, the wedge $f$ being thus shifted in its position so as to throw the larger amount of pressure upon the other end of the band. It will be obvious that under these conditions the friction of the band within the drum has a tendency to increase the expansion of the band, and so increase the holding power of the mechanism over that which may be caused by the pressure of the wedge alone. It will be apparent that the action of the brake band is practically that of a conventional single acting band brake mechanism with the superiority of operating equally well in either direction. Furthermore, since the wear of the friction surfaces will further increase the displacement of the position of the wedge the pressure applied on the movable end of the band, the wearing of the brake surfaces increases the efficiency of the mechanism.

It will be obvious that when the drum rotates, for example, in the direction shown by the arrow in Figs. 1 and 3, and the ends of the band are forced apart and against the drum, the extremity $c$ of the brake band will be drawn toward the stop $e$. The rotation of the drum will obviously, by its frictional contact with the brake band, tend to draw the extremity $c$ of the brake band toward the stop. When the rotation of the drum is reversed, however, the reverse effect will obviously result, the extremity $d$ of the brake band being drawn by frictional contact with the drum toward the fixed stop so that it will be seen that the brake will work equally the same in which ever direction the drum may be rotated. It will also be observed that a very short movement of the lever will set the brake. It is clear that by the setting of the brake, by the advancement of the wedge, any wear upon the wearing faces of the mechanism will be taken up, any wear simply necessitating a corresponding advance in the movement of the lever.

An important feature of the invention lies in the fact that the movement of the drum assists in setting the brake. Another important feature of the invention also lies in the fact that the brake will act just as well in one direction as in the other, so that while I employ a single acting brake band, I practically have a double acting brake. The band, when released, is supported upon arms $l$ projecting from the stationary part $m$ of the axle. The brake band is simply swung in place without being attached to any other part of the mechanism.

A brake so constructed is obviously economical as well as of superior efficiency, while the frictional contact of the drum with the brake band, in either direction, exerts a corresponding frictional tension upon the band. The lever will thus cause a wedging effect upon the brake band irrespective of the relative movements of the band and drum.

While I have shown a fixed stop between the extremities of the band, I do not limit myself solely to locating the stop between the extremities of the band, as any suitable means may be provided to limit the rotation of the band in either direction. The lever may be fulcrumed upon any fixed part of the mechanism also, within the scope of my invention.

What I claim as my invention is:

1. A brake mechanism comprising a rotatable brake drum, an unattached friction band within the drum having both extremities formed with wedge shaped faces, a fixed stop between the ends of the band, and means to be forced between the ends of the band to force the band against the drum, whereby the brake will be set in either direction.

2. A brake mechanism comprising a rotatable drum, an unattached expansible band within the drum normally free to rotate with the drum, a stop to limit the rotation of the band with the drum, and means to be forced between the extremities of the band to expand the band within the drum.

3. A band brake mechanism comprising a rotatable brake drum, an unattached expansible friction band within the drum, and means to expand said band whereby the rotation of the drum in either direction causes a part of the frictional tension.

4. A band brake mechanism comprising a friction drum, an unattached friction band within the drum having a limited movement with the drum in either direction, means to limit the movement of the band within the drum, and a wedge to be forced between the extremities of the band to expand the band and to force the band against the drum.

5. A band brake mechanism comprising a rotatable friction drum, an unattached friction band within the drum normally rotatable with the drum provided with wedge shaped faces at the extremities thereof, means to limit the rotation of the band, a wedge shaped device to be forced between the ends of the band provided with means to actuate the wedge.

In testimony whereof, I have signed this specification in the presence of two subscribing witnesses.

ALANSON P. BRUSH.

Witnesses:
N. S. WRIGHT,
E. M. SPIELBURG.